United States Patent Office 3,651,063
Patented Mar. 21, 1972

3,651,063
5-CYCLOHEXYLAMINO-6-METHYLURACIL
Masuo Murakami, Yuji Kawashima, and Noriki Ito, Tokyo, and Kuniichiro Yano, Saitama, Japan, assignors to Yamanouchi Pharmaceutical Co., Ltd., Tokyo, Japan
No Drawing. Filed Oct. 16, 1968, Ser. No. 768,154
Claims priority, application Japan, Oct. 18, 1967, 42/66,520; June 10, 1968, 43/39,803
Int. Cl. C07d 51/30
U.S. Cl. 260—256.4 C         1 Claim

ABSTRACT OF THE DISCLOSURE

Novel 5-aminomethyl-2,4-dihydroxy-6-methyl pyrimidine derivatives of the general formula

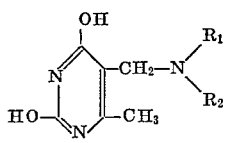

wherein $R_1$ and $R_2$ are same or different and each represents a hydrogen atom, alkyl radical having 1 to 4 carbon atoms, cyclohexyl or aryl radical, and the said $R_1$ and $R_2$ may be taken together with the nitrogen atom to form a heterocyclic ring which may contain a further hetero atom in the ring, with the proviso that $R_1$ and $R_2$ are not hydrogen atoms at the same time. The derivatives potentiate the efficiency of antibiotics such as chloramphenicol and josamycin. Compositions are provided comprising the said compound and an antibiotic.

---

This invention relates to novel agents with the potential to raise the efficiency of antibiotics. More particularly, it relates to 5-aminomethyl-2,4-dihydroxy-6-methyl pyrimidine derivatives of the general formula of

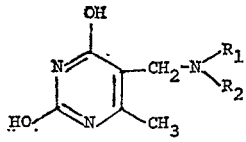

wherein $R_1$ and $R_2$ are same or different and each represents a radical selected from the group consisting of hydrogen atom, alkyl radical having 1 to 4 carbon atoms, substituted alkyl radical having 1 to 4 carbon atoms, cyclohexyl, radical, substituted cyclohexyl radical, phenyl radical, substituted phenyl radical and substituted pyrazinyl radical, the substituents on such radicals being, for example, alkyl, e.g. lower alkyl, hydroxy and the like; and the said $R_1$ and $R_2$ may be taken together with the nitrogen atom to which they are attached to form a heterocyclic ring which may contain a further hereto atom in the ring, e.g. a four to eight membered ring, for example, piperidino, morpholino, pyrrolidino and the like; with the proviso that the $R_1$ and $R_2$ cannot be hydrogen atoms at the same time. These compounds raise the efficiency of antibiotics such as chloramphenical and josamycin (josamycin is an antiboitic which has properties of the macrolide group of antibiotics and has been obtained by cultivating *Streptomyces narbonesis* var. *josamyceticus*, ATCC No. 17835, which has been isolated from Japanese soil. This antibiotic has already been patented in Canada and France as No. 782,571 and No. M 4,385 respectively). Compositions comprising an antibiotic such as chloamphenical or josamycin and the said compound constitute a part of the invention.

Recently many types of antibiotics are being used in the treatment of infectious diseases, especially chloramphenicol as it has a wide antimicrobial spectrum. However, when antibiotics are used in large doses, adverse reactions can occur, for example when chloramphenicol is used in large doses it is known that aplastic anemia and other serious adverse reactions occur. Therefore research has been taking place to discover an agent which will make it possible when it is added to antibiotics to administer small doses of antibiotics with the same results as that of the large doses without the adverse reactions of larger doses. Thus G. K. Koralve; Zh. Microbiol. Epidemiol. Immunobiol. 42, (6) 21–24 (1965) reports that the 2,4 - dihydroxy-5-hydroxymethyl-6-methyl pyrimidine which has the formula.

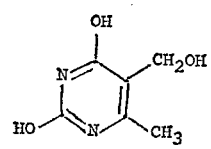

has the above mentioned effect of making it possible when it is added to antibiotics, to reduce the dosage without reducing the effects while avoiding the adverse reaction of a large dosage.

6-methyl uracil also has such an effect (Antibiotiki, 3, 90–94 (1959)).

The compounds of this invention have an even stronger effect than the effect of the two abovementioned agents.

As the compounds of this invention, the following illustrative compounds can be listed:

5-cyclohexylaminomethyl-2,4-dihydroxy-6-methyl pyrimidine,
2,4-dihydroxy-6-methyl-5-morpholinomethyl pyrimidine,
2,4-dihydroxy-6-methyl-5-piperidinomethyl pyrimidine,
5-diethylaminomethyl-2,4-dihydroxy-6-methyl pyrimidine,
2,4-dihydroxy-5-isopropylaminomethyl-6-methyl pyrimidine,
2,4-dihydroxy-6-methyl-5-p-toluidinomethyl pyrimidine,
2,4-dihydroxy-5-ethylaminomethyl-6-methyl pyrimidine,
2,4-dihydroxy-6-methyl-5-phenylaminomethyl pyrimidine,
5-bis(2-hydroxyethyl)aminomethyl-2,4-dihydroxy-6-methyl pyrimidine,
2,4-dihydroxy-6-methyl-5-(3-methyl-pyrazinyl-2)-aminomethyl pyrimidine,
2,4-dihydroxy-5-(2-hydroxyethyl)aminomethyl-6-methyl pyrimidine,
5-dibutylaminomethyl-2,4-dihydroxy-6-methyl pyrimidine,
2,4-dihydroxy-5-(N-ethyl-N-(2-hydroxyethyl)amino) methyl-6-methyl pyrimidine,
2,4-dihydroxy-5-(4-methylcyclohexyl)aminoethyl-6-methyl pyrimidine and
5-dicyclohexylaminomethyl-2,4-dihydroxy-6-methyl pyrimidine.

The compounds of this invention may be prepared by reacting 1 mol of a 2,4-dihydroxy-6-methyl pyrimidine represented by the formula

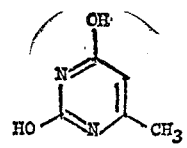

and more than 1 mol, preferably 1 to 2 mols. of an amine represented by the general formula

(wherein $R_1$ and $R_2$ are as defined above), in an organic solvent in the presence of more than 1 mol, preferably 1.5 to 2 mols of formaldehyde or its precursors such as paraformaldehyde which generate a formaldehyde in the reaction system. Moreover, the compounds of this invention also may be prepared by reacting 1 mol of 2,4-dihydroxy-5-halogenomethyl-6-methyl pyrimidine represented by the general formula

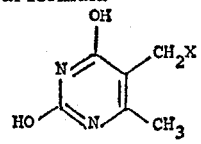

(wherein X means a halogen atom) and more than 1 mol, preferably 2 to 3 mols of the amine shown by the Formula IV in an organic solvent.

Preferably, ethanol or dioxane can be used as a solvent in the reactions of this invention.

These reactions progress smoothly at room temperature. The reactions may be accelerated by heating.

The compounds of this invention can easily be isolated because it usually precipitated in the reaction mixture as pure crystal. Often, it may be isolated according to conventional procedure, for example, by adding an organic solvent which is freely miscible with the solvent used in the reactions and does not dissolve the compound of this invention, to the reaction mixture after concentration or without concentration.

Preparation for the compounds of this invention will be furthermore explained by later examples.

The compounds of this invention have been tested for the effect in comparison with the above mentioned known compounds as follows.

Experimental procedure

The dd Y mice, 5 weeks old, weighing about 20 g., were used. The groups of 10 mice were inoculated subcutaneously in the back with $10^8$ cells (in 0.1 ml. volume) of *Staphylococcus aureus* No. 226 strain from Dr. I Tadokoro (Institute for Infectious Diseases, University of Tokyo), which had been cultured in $10\times$ horse serum-brain heart infusion broth for 18 hours. Immediately after the infection, antibiotics were given orally alone or along with an orally administered potentiating agent which increases the effect of the antibiotics. After 48 hours, the animals were killed, the skin of the backside was cut open, and the subcutaneous abscesses which had formed were observed.

| Antibiotics | | Potentiating agent | | Mean size of abscess (mm.²) | Reference |
|---|---|---|---|---|---|
| Name | Dosage, mg./kg. | Name | Dosage, mg./kg. | | |
| | | | | 147.0 | |
| | | 2,4-dihtdroxy-6-methyl-5-morpholino-methyl pyrimidine. | 50 | 150.4 | Compound of Ex. 2. |
| Chloramphenicol | 50 | | | 27.4 | |
| | 100 | | | 13.2 | |
| | 50 | 2,4-dihydroxy-5-hydroxy-methyl-6-methyl pyrimidine. | 50 | 18.9 | Known compound. |
| | 100 | 6-methyl uracil | 100 | 3.1 | Do. |
| | 50 | 2,4-dihydroxy-6-methyl-5-morpholinomethyl pyrimidine. | 50 | 11.9 | Compound of Ex. 2. |
| | 50 | 5-cyclohexylaminomethyl-2,4-dihydroxy-6-methyl pyrimidine. | 50 | 11.3 | Compound of Ex. 1. |
| | 100 | do | 20 | 2.5 | Do. |
| | 100 | do | 100 | 1.5 | Do. |
| Josamycin | 50 | | | 20.0 | |
| | 100 | | | 2.8 | |
| | 25 | 5-cyclohexylaminomethyl-2,4-dihydroxy-6-methyl pyrimidine. | 25 | 25.7 | Compound of Ex. 1. |
| | 50 | do | 25 | 3.9 | Do. |
| | 100 | do | 25 | 0.0 | Do. |

As seen from Table 1, the compound of this invention along with antibiotics showed a definite decrease in abscess size, and also demonstrated synergistic action.

The toxicity of a compound of this invention has been tested with mice. As seen from Table 2 the toxicity is at a very low level.

TABLE 2

| Potentiating agent | Sex of mouse | LD 50 | | Reference |
|---|---|---|---|---|
| | | Oral administration, mg./kg. | Intraperitoneal injection, mg./kg. | |
| 5-cyclohexylamino-methyl-2,4-dihydrxy-6-methyl pyrimidine. | ♂ ♀ | >10,000 >10,000 | 615 600 | Compound of Ex. 1. |

The compounds of this invention are usually administered orally together with the antibiotics.

The proportion of the compound of this invention to the antibiotics may vary over fairly wide limits. Preferably the compound of this invention is present in amounts ranging from 0.1 to 2 parts by weight per part by weight of said antibiotic.

The form of a dosage unit is most conveniently a powdered mixture of the antibiotic and the compound of this invention enclosed in a gelatin capsule. A dosage unit may contain from about 50 to 300 mg. of the desired antibiotics with from 0.1 to 2 parts by weight of the compound of this invention. An inert diluent such as starch, sucrose, or magnesium stearate may be added if desired. If desired, the compositions may be granulated and administered as such, or may be compressed into tablets suitable for oral administration. The usual dosage with chloramphenicol is 30 to 50 mg. per kg. of body weight daily, in divided doses every 4 to 6 hours and with josamycin is 10 to 30 mg. per kg. of body weight daily, in divided doses every 4 to 6 hours. These dosage units will be administered by the attending physician in accordance with the age and condition of the patient, nature of the disease and in view of the other considerations peculiar to the individual patient.

EXAMPLE 1

Preparation of 5-cyclohexylaminomethyl-2,4-dihydroxy-6-methyl pyrimidine (a)(i) Into 30 ml. of ethanol 0.84 g. of 2,4-dihydroxy-6-methyl pyrimidine and 0.72 g. of cyclohexylamine were dissolved, and the solution thus formed was added to 0.56 ml. of a 40% aqueous solution of formaldehyde at room temperature while stirring, and the resulting solution was refluxed for 3 hours on an oil bath. After cooling, the crystals precipitated were recovered by filtration, were washed with ethanol and ether, and then the crystal recrystallized from the ethanol. The amount of the crystal of the objective compound was 1.2 g.

(ii) By repeating the same procedure as in the above case of this example, while using paraformaldehyde instead of formaldehyde (but with a refluxing time of 1 hour), 1.3 g. of the objective compound was obtained.

(b) Into 10 ml. of dioxane 1.9 g. of cyclohexylamine were dissolved, and to the solution 1.0 g. of 5-chloromethyl-2,4-dihydroxy-6-methyl pyrimidine was added, and then 5 ml. of dioxane were added to the solution, and then the reaction mixture was stirred for 30 minutes. The product precipitated was recovered by filtration, washed with small amount of ethanol, and then the product was recrystallized from ethanol. 0.77 g. of the objective compound were obtained.

Elementary analysis as $C_{12}H_{19}N_3O_2$ Calculated (percent): C, 60.73; H, 8.07; N, 17.71. Found (percent): C, 60.10; H, 7.89; N, 17.68.

EXAMPLE 2

Preparation of 2,4-dihydroxy-6-methyl-5-morpholinomethyl pyrimidine (a)(i) By treatment similar to the procedure as in the case of (a)(i) of the Example 1, while using 0.58 g. of morpholine instead of cyclohexylamine (but with a refluxing time of 15 hours, and by recrystallizing the product from water), 1.3 g. of the objective compound were obtained.

(ii) By repeating the same procedure as in the above case, while using paraformaldehyde instead of formaldehyde (but with a refluxing time of 4 hours), 1.4 g. of objective compound were obtained.

(b) Into 10 ml. of dioxane 4.0 g. of morpholine and 4.0 g. of triethylamine were dissolved, and to the solution 5.0 g. of 5-chloromethyl-2,4-dihydroxy-6-methyl pyrimidine were added and then the mixture was stirred for 1 hour. The precipitated product was separated by filtration, washed with methanol, and then recrystallized from water to give 4.5 g. of the objective compound which had a melting point of above 300° C.

Elementary analysis as $C_{10}H_{15}N_4O_3$ Calculated (percent): C, 53.32; H, 6.71; N, 18.66. Found (percent): C, 53.31; H, 6.61; N, 18.70.

EXAMPLE 3

Preparation of 2,4-dihydroxy-6-methyl-5-piperidinomethyl pyrimidine (a) Into 30 ml. of ethanol 0.84 g. of 2,4-dihydroxy-6-methyl pyrimidine and 0.66 g. of paraformaldehyde were dissolved, and to the solution 1.5 g. of piperidine were further added at room temperature while stirring, and the resulting solution was refluxed for 2 hours on an oil bath. Then the ethanol in the reaction mixture was removed by evaporation, and the residue produced was added to ethanol. The crystals precipitated were recovered by filtration, washed with ethanol and ether. The crystals were recrystallized from ethanol containing water to give 1.1 g. of the objective compound which had a melting point of above 305° C.

(b) Into 10 ml. of dioxane 1.63 g. of piperidine were dissolved, and to the solution 1.0 g. of 5-chloromethyl-2,4-dihydroxy-6-methyl pyrimidine was added, and then 5 ml. of dioxane were added. The reaction mixture was stirred for 1 hour at room temperature. The product was isolated by filtration and washed with small and washed with small amount of water to provide 1.4 g. of the objective compound. The product which was recrystallized from water or ethanol containing water and it showed a melting point of above 305° C.

Elementary analysis as $C_{11}H_{17}N_3O_2$.—Calculated (percent): C, 59.17; H, 7.67; N, 18.82. Found (percent): C, 59.98; H, 7.37; N, 18.33.

EXAMPLE 4

Preparation of 5-diethylaminomethyl-2,4-dihydroxy-6-methyl pyrimidine (a) By treatment similar to the procedure as in the case of (a) of the Example 3, while using 1.5 g. of diethylamine instead of piperidine (but with a refluxing time of 2 hours, and by recrystallizing the product from chloroform/ethanol), 0.17 g. of the objective compound which had a melting point of above 300° C. was obtained.

(b) Into 10 ml. of tetrahydrofuran 1.4 g. of diethylamine were dissolved, and to the solution 1.0 g. of 5-chloromethyl-2,4-dihydroxy-6-methyl pyrimidine was gradually added while stirring, further 5 ml. of tetrahydrofuran was added and stirred for 2 hours. The precipitated product was separated by filtration, washed with chloroform, and then recrystallized from chloroform/ethanol to give 0.6 g. of the objective compound which had a melting point of above 300° C.

Elementary analysis as $C_{10}H_{17}N_3O_2$.—Calculated (percent): C, 56.85; H, 8.11; N, 19.89. Found (percent): C, 56.79; H, 7.93; N, 19.74.

EXAMPLE 5

Preparation of 2,4-dihydroxy-5-isopropylaminomethyl-6-methyl pyrimidine (a) By treatment similar to the procedure of case of (a) of the Example 3, while using 1.2 g. of isopropylamine instead of piperidine (but with a refluxing time of 1.5 hours, and by recrystallizing the product from ethanol), 1.1 g. of the objective compound which had a melting point of 281 to 300° C. was obtained.

(b) Into 10 ml. of dioxane 1.2 g. of isopropylamine were dissolved, and the solution was cooled at 5° C. Then 1.0 g. of 5-chloromethyl-2,4-dihydroxy-6-methyl pyrimidine was gradually added into the solution while stirring, and then the reaction mixture was stirred for 1 hour at room temperature. The precipitated product was separated by filtration, washed with a small amount of ethanol to give 0.7 g. of the objective compound which had a melting point of 281 to 300° C. (decomposed slowly).

Elementary analysis as $C_8H_{15}N_3O_2$.—Calculated (percent): C, 51.89; H, 8.10; N, 22.70. Found (percent): C, 51.75; H, 8.01; N, 22.78.

EXAMPLE 6

Preparation of 2,4-dihydroxy-5-p-toluidinomethyl-6-methyl pyrimidine (a) Into 30 ml. of ethanol 0.84 g. of 2,4-dihydroxy-6-methyl pyrimidine and 0.66 g. of paraformaldehyde were dissolved, and to the solution another solution containing 2.3 g. of p-toluidine in 10 ml. of dimethylformamide was dropped at room temperature while stirring, and the resulting solution was refluxed for 2 hours on an oil bath. Then the solvent in the reaction mixture was removed by evaporation, and the residue produced was added to ether. The crystals precipitated were separated by filtration, washed with ethanol and ether. The crystals were recrystallized from ethanol containing water to give 1.1 g. of the objective compound which had a melting point of 305° C.

Elementary analysis as $C_{11}H_{17}N_3O_2$.—Calculated (percent): C, 59.17; H, 7.67; N, 18.82. Found (percent): C, 59.03; H, 7.35; N, 18.67.

EXAMPLE 7

Preparation of 2,4-dihydroxy-5-ethylaminomethyl-6-methyl pyrimidine (a) By treating similar to the procedure in case (a) of Example 3, while using 0.78 g. of monoethylamine instead of piperidine (but with a refluxing time of 1 hour), 1.0 g. of the objective compound was obtained.

This compound was dissolved in 20% of hydrochloric acid, and the resulting solution was concentrated under reduced pressure, and the residue produced was recrystallized from methanol/ether to give 0.9 g. of the hydrochloric acid salt of the objective compound.

(b) Into 10 ml. of dioxane 0.78 g. of monoethylamine were dissolved, and to the solution 1.0 g. of 5-chloromethyl-2,4-dihydroxy-6-methyl pyrimidine was gradually added at room temperature while stirring. By further stirring the reaction mixture gradually becomes a mud like mixture. After 1 hour the mixture was filtrated, and the precipitates were obtained and were washed with a small amount of dioxane, water and methanol successively, and dried to provide 1.12 g. of the objective compound.

This compound was dissolved in 20% hydrochloric acid, and the resulting solution was concentrated under reduced pressure, the residue produced was recrystallized from methanol/ether to give the hydrochloric acid salt of the objective compound.

Elementary analysis as $C_8H_{14}N_3O_2Cl$.—Calculated (percent): C, 43.74; H, 6.42; N, 19.13. Found (percent): C, 43.61. H, 6.38; N, 19.26.

EXAMPLE 8

Preparation of 2,4-dihydroxy-6-methyl-5-phenylaminomethyl pyrimidine (a) By treatment similar to the procedure in case (a) of Example 3, while using 1.8 g. of aniline instead of piperidine (but with a refluxing time of 1 hour, and by recrystallizing the product from ethanol), 0.5 g. of the objective compound which had a melting point of 238° C. was obtained.

(b) Into 15 ml. of dioxane 1.8 g. of aniline were dissolved, and to the solution 1.0 g. of 5-chloromethyl-2,4-dihydroxy-6-methyl pyrimidine was added, then the mixture was stirred for 1 hour at room temperature. The precipitated product was separated by filtration, washed with ethanol, and then recrystallized from ethanol to give 0.4 g. of the objective compound which had a melting point of 238° C.

Elementary analysis as $C_{12}H_{13}N_3O_2$.—Calculated (percent): C, 62.32; H, 5.67; N, 18.17. Found (percent): C, 62.35; H. 5.76; N, 18.02.

EXAMPLE 9

Preparation of 5-bis(2-hydroxyethyl)aminomethyl-2,4-dihydroxy-6-methyl pyrimidine (a) By treatment similar to the procedure in case (a) of Example 3, while using 0.81 g. of diethanolamine instead of piperidine (but with a refluxing time of 2 hours, and by recrystallizing the product from butanol), 1.15 g. of the objective compound were obtained.

(b) Into 7 ml. of dioxane 0.81 g. of diethanolamine and 0.4 g. of 5-chloromethyl - 2,4 - dihydroxy-6-methyl pyrimidine were suspended and the suspension was vigorously stirred. The precipitated viscous product was washed with n-butanol to give 1.15 g. of the objective compound.

Elementary analysis as $C_{10}H_{17}N_3O_4$.—Calculated (percent): C, 49.37; H, 7.04; N, 17.28. Found (percent): C, 49.15; H, 6.98; N, 17.10.

EXAMPLE 10

Preparation of 2,4-dihydroxy-6-methyl-5-(3-methylpyrazinyl-2)aminomethyl pyrimidine (a) By treatment similar to the procedure as in case (a) of Example 3, while using 0.5 g. of 2-amino-3-methylpyrazine instead of piperidine (but with a refluxing time of 2 hours), the product precipitated was separated by filtration, washed with ethanol, and then recrystallized from methanol/hydrochloric acid to give 0.84 g. of hydrochloric acid salt of the objective compound.

(b) Into 20 ml. of dioxane 0.5 g. of 2-amino-3-methyl pyrazine were dissolved, and to the solution 1.0 g. of 5-chloromethyl - 2,4 - dihydroxy-6-methyl pyrimidine was added and the resulting solution was stirred for 2 hours at room temperature. The precipitated product was separated by filtration, and it was dissolved in 50% hydrochloric acid. The crystals precipitated were washed with ethanol to give 0.89 g. of the hydrochloric acid salt of the objective compound. This compound was recrystallized from methanol/ethanol.

Elementary analysis as $C_{11}H_{14}N_5O_2Cl$. — Calculated (percent): C, 46.57; H, 4.97; N, 24.68. Found (percent): C, 46.36; H, 5.16; N, 24.29.

EXAMPLE 11

Preparation of 2,4-dihydroxy-5-(2-hydroxyethylamino)-methyl-6-methyl pyrimidine (a) Into 10 ml. of ethanol 210 mg. of 2,4-dihydroxy-6-methyl pyrimidine and 105 mg. of monoethanol amine were dissolved and the solution thus formed was added to 0.185 ml. of a 40% aqueous solution of formaldehyde while stirring, and the resulting solution was refluxed for 20 hours on an oil bath. After cooling, the crystals precipitated were recovered by filtration, and the crystals were washed with hot ethanol and hot water. To the crystals were added 5 ml. of an aqueous acetic acid. After removing the crystals by filtration of the insoluble matter, then an aqueous ammonia was added to the filtrate to give the precipitate. After filtrating the residue obtained was washed with water to provide 205 mg. of the objective compound which had a melting point of above 300° C.

(b) Into 10 ml. of dioxane 549 mg. of monoethanolamine were dissolved, and to the solution 524 mg. of 2,4-dihydroxy-5-chloromethyl-6-methyl pyrimidine were gradually added at room temperature while stirring. Then the resulting solution was stirred for 2 hours at room temperature. After cooling, the precipitated product was recovered by filtration, washed with water and ethanol. To the crystals 5 ml. of aqueous acetic acid were added. After removal of the insoluble matter by filtration, then an aqueous ammonia was added to the filtrate to give the precipitate. After filtrating the residue obtained was washed with water to provide 585 mg. of the objective compound which had a melting point of above 300° C.

Elementary analysis as $C_8H_{13}N_3O_3$.—Calculated (percent): C, 48.23; H, 6.58; N, 21.09. Found (percent): C, 48.53; H, 6.36; N, 21.12.

EXAMPLE 12

Preparation of 5-dibutylaminomethyl-2,4-dihydroxy-6-methyl pyrimidine (a) Into 10 ml. of ethanol 524 mg. of 2,4-dihydroxy-6-methyl pyrimidine and 1.2 g. of dibutylamine were dissolved, and to the solution 0.4 ml. of a 40% aqueous solution of formaldehyde were added under stirring, and the resulting solution was refluxed for 20 hours on an oil bath. After cooling the precipitated crystals were recovered by filtration, washed with hot ethanol and hot water. To the crystals 5 ml. of aqueous acetic acid were added. After removal of the insoluble matter by filtration, an aqueous ammonia was added to the filtrate to give the precipitate. After filtration the residue obtained was washed with water to provide 610 mg. of the objective compound which had a melting point of above 300° C.

(b) Into 10 ml. of dioxane 1.1 g. of dibutylamine were dissolved, and to the solution 524 mg. of 5-chloromethyl-2,4-dihydroxy-6-methyl pyrimidine were gradually added, and after the resulting solution was stirred for 2 hours at room temperature, it became a clear solution. The dioxane was removed under reduced pressure, and then the residue was washed with water. To the residue 5 ml. of aqueous acetic acid were added. After the removal of the insoluble matter by filtration, an aqueous ammonia was added to the filtrate to give the precipitate. After filtration the residue obtained was washed with water to provide 600 mg. of the objective compound which had a melting point of above 300° C.

Elementary analysis as $C_{14}H_{25}N_3O_2$.—Calculated (percent): C, 62.89; H, 9.42; N, 15.72. Found (percent): C, 62.73; H, 9.31; N, 15.68.

EXAMPLE 13

Preparation of 2,4-dihydroxy-5-(N-ethyl-N-(2-hydroxyethyl)amino)methyl-6-methyl pyrimidine (a) Into 10 mg. of ethanol 524 mg. of 5-chloromethyl-2,4-dihydroxy-6-methyl pyrimidine and 800 mg. of N-ethyl-N-(2-hydroxyethyl)amine were dissolved, and 0.2 ml. of a 40% aqueous solution of formaldehyde were added to the solution while stirring, and the resulting solution was refluxed for 20 hours on an oil bath. After cooling, precipitated crystals were recovered by filtration, and the crystals were washed with hot ethanol and hot water. To the crystals 5 ml. of aqueous acetic acid were added. After the insoluble matter was removed by filtration, an aqueous ammonia was added to the filtrate to give the precipitate. After the insoluble matter was removed by filtration, an aqueous ammonia was added to the filtrate to give the precipitate. After filtrating the obtained residue was washed with water to provide 310 mg. of the objective compound which had a melting point of 176 to 178° C.

(b) Into 10 ml. of dioxane 800 mg. of N-ethyl-N-(2-hydroxyethyl)amine were dissolved, and to the solution 524 mg. of 2,4-dihydroxy-5-chloromethyl-6-methyl pyrimidine were added at room temperature while stirring. The reaction mixture became a clear solution, and after for about 15 minutes it began to precipitate as white crystals. Then the reaction mixture was stirred for 1 hour at room temperature. The crystals were recovered by filtration, washed with ethanol and recrystallized from ethanol to give 300 mg. of the objective compound which had a melting point of 176 to 178° C.

Elementary analysis as $C_{10}H_{17}N_3O_3$ Calculated (percent): C, 52.35; H, 7.54; N, 18.49. Found (percent): C, 52.42; H, 7.47; N, 18.47.

EXAMPLE 14

Preparation of 2,4-dihydroxy-5-(4-methylcyclohexylamino)methyl-6-methyl pyrimidine (a) Into 10 ml. of ethanol 524 mg. of 2,4-dihydroxy-6-methyl pyrimidine and 1.0 g. of trans-4-methyl cyclohexylamine were dissolved, and to the solution 0.2 ml. of a 40% aqueous solution of formaldehyde were added while stirring, then the resulting solution was refluxed by heating for 20 hours. After cooling the precipitated crystals were recovered by filtration, and washed with hot ethanol and hot water. To the residue 5 ml. of aqueous acetic acid were added. After the insoluble matter was removed by filtration, and an aqueous ammonia was added to the filtrate to give the precipitate. After filtration the obtained residue was washed with water to provide 210 mg. of the objective compound which had a melting point of above 300° C.

(b) Into 10 ml. of dioxane 1.02 g. of trans-4-methyl cyclohexylamine were dissolved, and to the solution 524 mg. of 2,4-dihydroxy-5-chloromethyl-6-methyl pyrimidine were added at room temperature while stirring, and then the resulting solution was stirred for 3 hours at room temperature. The precipitated product was recovered by filtration, and washed with ethanol and ether. The product was recrystallized from ethanol to provide 200 mg. of the objective compound which had a melting point of above 300° C.

Elementary analysis as $C_{13}H_{20}N_3O_2$ Calculated (percent): C, 62.13; H, 8.42; N, 16.72. Found (percent): C, 62.18; H, 8.23; N, 16.75.

EXAMPLE 15

Preparation of 5-dicyclohexylaminomethyl-2,4-dihydroxy-6-methyl pyrimidine (a) Into 10 ml. of ethanol 524 mg. of 2,4-dihydroxy-6-methyl pyrimidine and 1.6 g. of dicyclohexylamine were dissolved, and to the solution 0.185 ml. of a 40% aqueous solution of formaldehyde was added while stirring, then the resulting solution was refluxed by heating for 20 hours. After cooling the precipitated crystals were recovered by filtration, and washed with hot ethanol and hot water. To the crystals 5 ml. of aqueous acetic acid were added. After the insoluble matter was removed by filtration, and an aqueous ammonia was added to the filtrate to give the precipitate. After filtrating the obtained residue was washed with water to provide 208 mg. of the objective compound having a melting point of about 300° C.

(b) Into 10 ml. of dioxane 1.6 g. of dicyclohexylamine were dissolved, and to the solution 524 mg. of 5-chloromethyl-2,4-dihydroxy-6-methyl pyrimidine were added at room temperature while stirring, and then the resulting solution was stirred for 3 hours at room temperature. The precipitated product was recovered by filtration, and washed with ethanol and water. To the product 5 ml. of aqueous acetic acid were added. After the insoluble matter was removed by filtration, and an aqueous ammonia was added to the filtrate to give the precipitate. After filtrating the residue obtained was washed with water to provide 570 mg. of the objective compound which had a melting point of about 300° C.

Elementary analysis as $C_{18}H_{29}N_3O_2$ Calculated (percent): C, 67.67; H, 9.15; N, 13.16. Found (percent): C, 67.52; H, 9.16; N, 13.21.

EXAMPLE 16

Capsule formulation

| | Per capsule, Mg. |
|---|---|
| Chloramphenicol | 200 |
| 2,4 - dihydroxy-6-methyl-5-morpholinomethyl pyrimidine | 50 |
| Total wt. | 250 |

Procedure: (1000 capsules)

(1) 200 g. of chloramphenicol and 50 g. of 2,4-dihydroxy-6-methyl - 5 - morpholinomethyl pyrimidine were mixed with a suitable mixing apparatus.

(2) The mixture was further blended by passing it through a Fitzpatrick comminuting machine with a No. 1A screen with the knives forward.

(3) No. 4 hard shell gelatin capsules were filled with 250 mg. of the blended powder per capsule on a capsulating machine and 1000 capsules were obtained.

What is claimed is:

1. 5-cyclohexylaminomethyl-2,4-dihydroxy - 6 - methyl pyrimidine.

References Cited

British Patent, Chem. Abstracts, 61: 6567–8 (1964).
Caldwell et al., Chem. Abstracts, 30.

ALEX MAZEL, Primary Examiner

R. J. GALLAGHER, Assistant Examiner

U.S. Cl. X.R.

260—247.5 R; 424—121, 248, 251